US012311878B2

(12) United States Patent
Tsai

(10) Patent No.: US 12,311,878 B2
(45) Date of Patent: May 27, 2025

(54) METHOD OF UNLOCKING A VEHICLE DOOR

(71) Applicant: AMBIT MICROSYSTEMS (SHANGHAI) LTD., Shanghai (CN)

(72) Inventor: Cheng-Lung Tsai, Hsinchu (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 125 days.

(21) Appl. No.: 18/236,848

(22) Filed: Aug. 22, 2023

(65) Prior Publication Data
US 2024/0166164 A1 May 23, 2024

(30) Foreign Application Priority Data

Nov. 21, 2022 (CN) .......................... 202211456685.1

(51) Int. Cl.
*B60R 25/24* (2013.01)
*B60R 25/01* (2013.01)
*G07C 9/00* (2020.01)

(52) U.S. Cl.
CPC .............. *B60R 25/24* (2013.01); *B60R 25/01* (2013.01); *G07C 9/00309* (2013.01); *B60R 2325/103* (2013.01); *G07C 2009/00793* (2013.01)

(58) Field of Classification Search
CPC ... B60R 25/24; B60R 25/01; B60R 2325/103; B60R 2325/205; H04L 9/0869; H04L 9/3228; H04W 4/40; H04W 12/04; G06K 9/00818
See application file for complete search history.

(56) References Cited

U.S. PATENT DOCUMENTS

| | | | | |
|---|---|---|---|---|
| 10,507,795 | B1 * | 12/2019 | Schubert | B60R 25/241 |
| 11,597,277 | B2 * | 3/2023 | Pei | H04W 4/40 |
| 2017/0374550 | A1 * | 12/2017 | Auer | H04W 4/80 |

FOREIGN PATENT DOCUMENTS

| | | |
|---|---|---|
| CN | 101708707 A | 5/2010 |
| CN | 204506793 U | 7/2015 |
| CN | 105844749 A | 8/2016 |
| CN | 111435944 A | 7/2020 |
| CN | 113225178 A | 8/2021 |

* cited by examiner

*Primary Examiner* — Vernal U Brown
(74) *Attorney, Agent, or Firm* — ScienBiziP, P.C.

(57) ABSTRACT

A method of unlocking a vehicle door, including generating a dynamic password based on dynamic information by a vehicle chip, then generating a reference key based on the dynamic password, and storing the reference key in a storage medium; updating the dynamic password stored in a server, and according to the request of the mobile device, providing the dynamic password to the mobile device through the server, and the mobile device generating a mobile key according to the dynamic password. Finally, the reference key and the mobile key are compared, and if the dynamic passwords corresponding to the reference key and the mobile key are the same, the vehicle door corresponding to the vehicle chip is unlocked by the vehicle chip.

10 Claims, 3 Drawing Sheets

METHOD OF UNLOCKING A VEHICLE DOOR

FIELD

The subject matter herein relates to a method of unlocking a vehicle door, and more particularly to a method of unlocking a vehicle door by utilizing dynamics to update the password.

BACKGROUND

Various technologies have been developed to utilize mobile devices, such as smart phones. In addition to the traditional functions of making phone calls, these devices can now be used as mobile keys. This means that users can use their mobile devices to unlock or release the vehicle's door lock without the need for a separate vehicle key. The traditional method relies on a fixed password for verification, which may be vulnerable to theft or password cracking.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
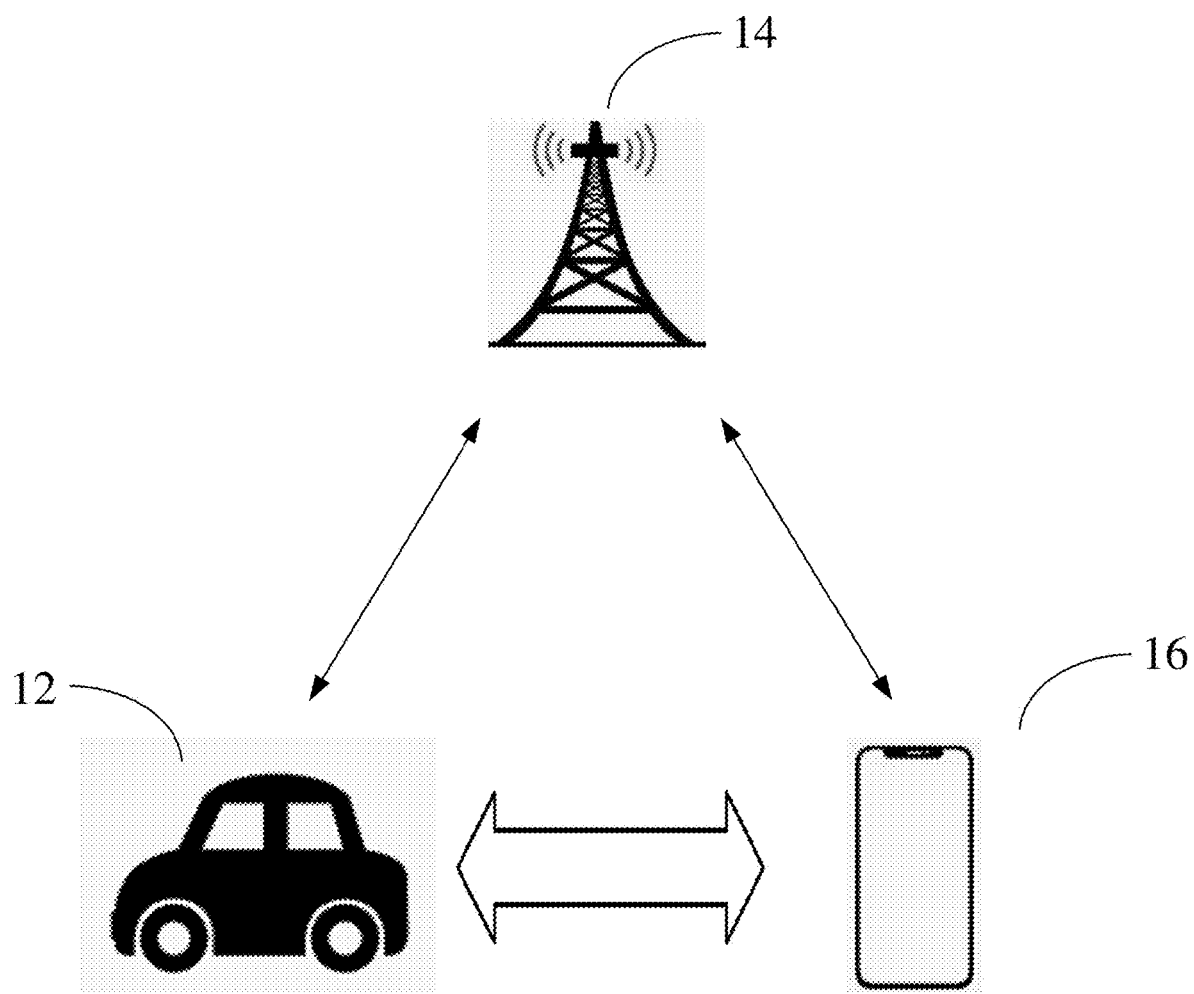
FIG. 1 is a schematic diagram of an environment in which a mobile device is used to unlock a vehicle door according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a schematic diagram of an environment in which a mobile device is used to unlock a vehicle door according to an embodiment of the disclosure. According to the embodiment of the present application, the vehicle 12 generates a dynamic password based on the dynamic information and generates a reference key using the vehicle chip in accordance with the dynamic password; according to an embodiment of the present application, the reference key can be stored in a local storage medium of the vehicle 12 through the vehicle chip media, such as a memory card or a hard disk, or a remote storage medium stored outside the vehicle 12, such as a cloud drive. In some embodiments, the storage medium is an electronic, magnetic, optical, electromagnetic, infrared and/or semiconductor system (or device). Examples of storage media include semiconductor or solid-state memory, magnetic tape, removable computer disks, random access memory (RAM), read-only memory (ROM), rigid magnetic disk and/or optical disk.

The vehicle 12 communicates with the remote server 14 through the vehicle chip and transmits the generated dynamic password to the server 14. In one embodiment of the present application, the vehicle 12 can engage in Vehicle-to-Vehicle (V2V) communication through vehicle-to-everything (V2X) for early warning, Vehicle-to-Vehicle-to-Infrastructure (V2I) (such as traffic lights, traffic signs, parking spaces), vehicle-to-pedestrian (V2P) communication for pedestrian safety, and Vehicle-to-Pedestrian-Network(V2N). Additionally, in one embodiment of the present application, the vehicle 12 can utilize the cellular network communication interface (Uu) for network connectivity through C-V2X technology.

The server 14 can store and update the dynamic password, as well as communicate with all devices within the service or perform security verification, and authentication management. The server 14 updates the originally stored dynamic password to the dynamic password received by the vehicle 12. According to an embodiment of the present application, the server 14 may be a wireless access point, base station or a cloud device capable of communicating with the vehicle 12.

The mobile device 16 can install an application program (application), which is used to communicate with the vehicle 12 through the wireless communication (such as Bluetooth protocol) to perform security verification and binding management of the mobile device 16, and perform security verification with the server 14, and send a request to the server 14 to obtain a dynamic password, and generate a mobile key according to the dynamic password. According to an embodiment of the present application, the mobile device 16 can be a smart phone, a tablet computer, or a notebook computer. The mobile device 16 converts the dynamic password into a mobile key uses an encryption method, and uses near field communication (NFC), Bluetooth Low Energy (BLE) or Ultra-wideband (UWB) to transfer the mobile key to the vehicle 12. The vehicle 12 receives the mobile key, and compares whether the dynamic password corresponding to the reference key and the mobile key are matched. When the dynamic password corresponding to the reference key and the mobile key are matched (for example, they are the same), the doors are unlocked.

Figure 2:
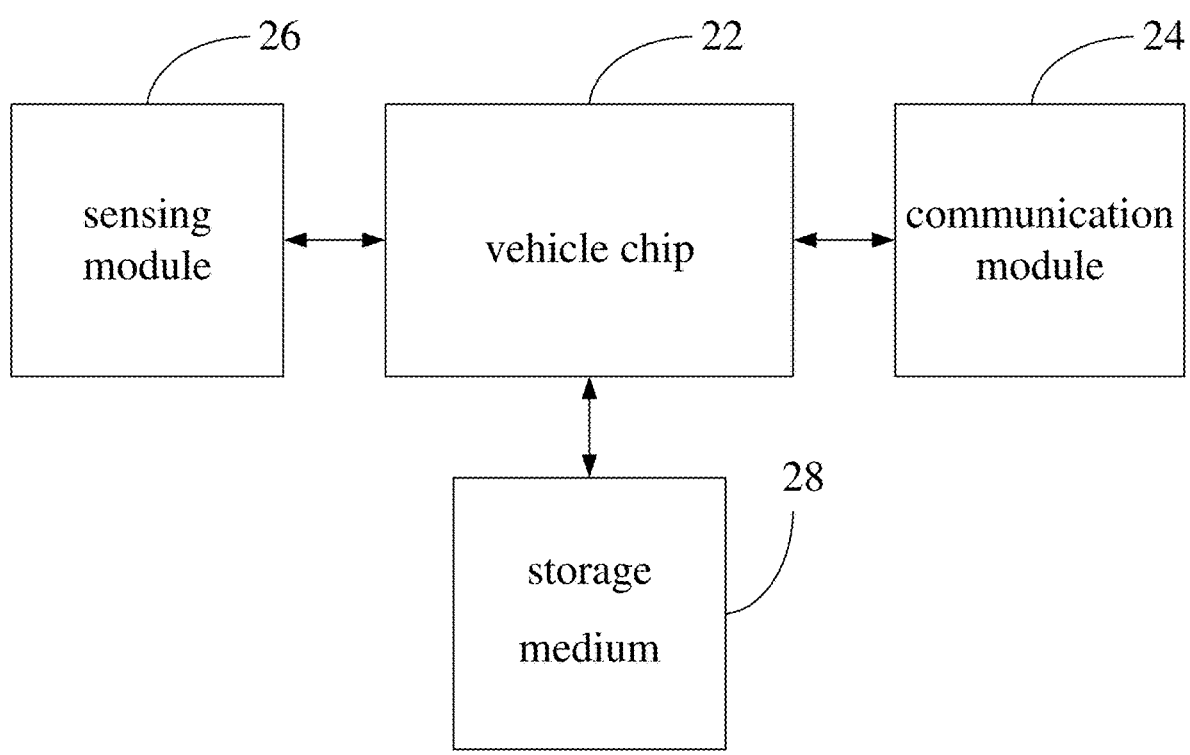
FIG. 2 is a system architecture diagram inside a vehicle according to an embodiment of the disclosure.

FIG. 2 is a diagram of a system architecture within a vehicle according to an embodiment of the disclosure. In this embodiment, only the devices and actions related to using the mobile device to unlock the vehicle door are described. Other parts or functions of the vehicle are commonly understood technical means used by those skilled in the art and, therefore, are not repeated for brevity. The vehicle chip 22 generates a dynamic password according to the dynamic information, and generates a reference key according to the dynamic password. According to an embodiment of the present application, the dynamic information may include the communication status of the vehicle chip 22. For example, the vehicle chip 22 can determine the communication status based on the signal transmitting power, and the signal receiving power of the received signal obtained by a communication module 24. According to another embodiment of the present application, the dynamic information can include the base station identification code (Cell ID) of a base station that is connected to the vehicle chip 22, the base station being on the moving path of the vehicle. For example, during the process of moving the vehicle from the first position to the second position, the vehicle chip 22 is sequentially connected to the first base station, the second base station and the third base station. The base station identification codes of the three base stations can be used as the content of the dynamic information. The dynamic information can also include a time value, for example, the vehicle chip 22 obtains the current time through a satellite connection, or obtains the time value through a local clock of the vehicle chip 22.

According to another embodiment of the present application, the sensing module 26 may include a variety of sensors, such as vehicle speed sensors, tire pressure sensors, cameras, temperature sensors inside or outside the vehicle, etc., and the vehicle chip 22 is based on the average vehicle speed, tire pressure, image outside the vehicle, temperature inside or outside the vehicle, etc. obtained by the sensing module 26 during a predetermined time period can generate dynamic information. It should be noted that the dynamic information can be generated independently by using the parameters listed above, or multiple parameters can be combined and arranged to generate dynamic information. Next, the vehicle chip 22 can encode the dynamic information to generate a dynamic password, convert the dynamic password into a reference key through encryption, and store the reference key in the storage medium 28. Since the dynamic information obtains real-time parameters related to the vehicle through the vehicle chip 22, and the encoding method is difficult for the outside world to obtain, the obtained dynamic password is relatively secure. It should be noted that the encryption method used by the vehicle chip 22 and the mobile device 16 must match each other, and the vehicle chip 22 can also provide the encryption logic to the server 14. Enable the mobile device 16 to obtain the encryption logic from the server 14 in order to match the encryption method used by the vehicle chip 22.

According to an embodiment of the present application, the vehicle chip 22 can upload the dynamic password to the server 14 in order to update the dynamic password stored in the server 14 when the vehicle is parked (such as after the P gear), or it can be set at a predetermined frequency, such as every 5 minutes, to periodically update the dynamic password stored in the server 14. This helps to prevent situations where the vehicle enters a no-signal area, which may result in the dynamic password in the server 14 not being able to be updated. It should be noted that if the vehicle chip 22 cannot update the dynamic password of the server 14, the vehicle chip 22 does not change the reference key stored in the storage medium 28.

Figure 3:
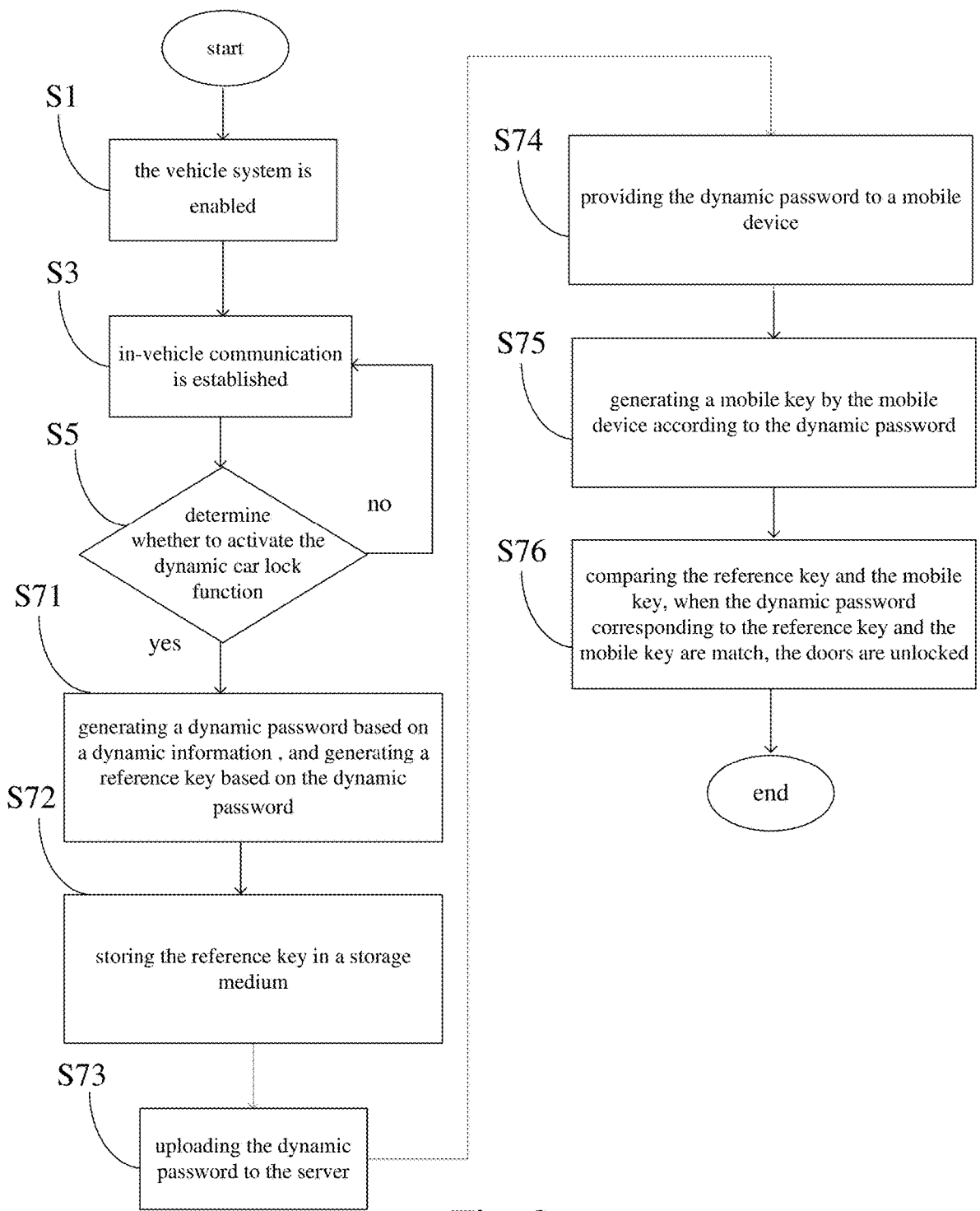
FIG. 3 is a flowchart of configuring a dynamic password according to an embodiment of the disclosure.

FIG. 3 is a flowchart of configuring a dynamic password according to an embodiment of the disclosure. Referring to FIGS. 1-3, according to an embodiment of the present application, first, the vehicle system is enabled (process step S1), and then in-vehicle communication is established (process step S3), so that the vehicle chip 22 can communicate with the mobile device 16 using the Bluetooth protocol for mobile device 16 security authentication and binding management. Next, it is determined whether the dynamic vehicle lock function is to be activated (process step S5). If the dynamic vehicle lock function has not been activated, the process returns to the process step S3, and the vehicle chip 22 continues to communicate with the mobile device 16 using the Bluetooth protocol.

According to an embodiment of the present application, the dynamic vehicle lock function can be activated through the application program installed on the mobile device 16. When it is confirmed in the process step S5 that the dynamic vehicle lock function has been activated, the vehicle chip 22 starts to generate a dynamic password according to the dynamic information, and a reference key is generated according to the dynamic password. As mentioned above, the dynamic information may include the communication status of the vehicle chip 22, the base station identification code of the base station connected to the vehicle chip 22, the time value, and the average vehicle speed, tire pressure, outside image, vehicle parameters such as temperature inside or outside the vehicle can be generated independently by using the parameters listed above, or dynamic information may be generated by combining and arranging a plurality of parameters.

Next, in the process step S71, the vehicle chip 22 encodes the dynamic information to generate a dynamic password, and converts the dynamic password into a reference key by an encryption method, and in the process step S72, stores the reference key in the storage medium 28. In the process step S73, the vehicle chip 22 uploads the dynamic password to the server 14. According to an embodiment of the present application, the vehicle chip 22 can upload the dynamic password to the server 14 to update the dynamic password stored in the server 14 when the vehicle is parked (for example, after turning on the P gear), or it can be set at a predetermined frequency (for example, every 5 minutes) to periodically update the dynamic password stored in the server 14. This helps to prevent situations where the vehicle enters a no-signal area, which may cause the dynamic password in the server 14 not to be updated. It must be noted that if the vehicle chip 22 cannot update the dynamic password of the server 14, the vehicle chip 22 does not change the reference key stored in the storage medium 28.

Next, in the process step S74, the mobile device 16 performs security verification with the server 14 through the installed application, and sends a request to obtain a dynamic password through the server 14, and in the process step S75, generates a mobile key according to the dynamic password, and completes the process of configuring a dynamic password is described. Afterwards, the mobile device 16 converts the dynamic password into a mobile key, and uses communication technologies such as Near Field Communication (NFC), Bluetooth Low Energy (BLE) or Ultra-Wideband (UWB) to transfer the mobile key to the vehicle 12. In the process step S76, the vehicle 12 receives the mobile key and compares whether the dynamic password corresponding to the reference key and the mobile key are match. If the dynamic password corresponding to the reference key and the mobile key are matched (for example, they are the same), the doors are unlocked.

According to the method of unlocking the vehicle door described in the embodiment of the present application, by utilizing the vehicle chip, a variable dynamic password is generated based on the real-time status of the vehicle in order to identify the mobile key for the vehicle. This method enhances the security of the mobile key service compared to the traditional approach of setting a fixed password for verifying the mobile key by vehicle dealers. In addition, a new dynamic password is generated each time the vehicle is driven, further preventing mobile key of the vehicle from being stolen or cracked. Through the design described in the embodiment of this application, the original hardware architecture, the variable dynamic password mechanism, and the characteristics of the vehicle-to-everything (V2X) are utilized, thereby enhancing vehicle security.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method of unlocking a vehicle door, the method comprising:
   generating a dynamic password based on a dynamic information by a vehicle chip, and generating a reference key based on the dynamic password;
   storing the reference key in a storage medium;
   uploading the dynamic password to a server for storing the dynamic password in the server;
   providing the dynamic password to a mobile device through the server according to a request of the mobile device;
   generating a mobile key by the mobile device according to the dynamic password;
   comparing the reference key and the mobile key; and
   unlocking the vehicle door by the vehicle chip when the dynamic passwords corresponding to the reference key and the mobile key are the same.

2. The method of claim 1, wherein the dynamic information includes a communication status of the vehicle chip.

3. The method of claim 2, wherein the communication status includes a signal transmitting power and a signal receiving power of the vehicle chip.

4. The method of claim 1, wherein the dynamic information includes a base station identification code of a base station to which the vehicle chip is connected.

5. The method of claim 1, wherein the dynamic information includes a time value obtained by the vehicle chip.

6. The method of claim 5, wherein the vehicle chip obtains the time value through a connection with a satellite.

7. The method of claim 1, wherein the dynamic information includes an average vehicle speed of the vehicle in a predetermined time period obtained by the vehicle chip.

8. The method of claim 1, wherein the dynamic password stored in the server is periodically updated by the vehicle at a predetermined frequency.

9. The method of claim 1, wherein the dynamic password stored in the server is updated by the vehicle chip when the vehicle is parked.

10. The method of claim 1, wherein the mobile key is transmitted by the mobile device to the vehicle chip through a near field communication (NFC) interface.

\* \* \* \* \*